United States Patent
Schwabe

(10) Patent No.: US 8,519,770 B2
(45) Date of Patent: Aug. 27, 2013

(54) CIRCUIT ARRANGEMENT AND INPUT ASSEMBLY

(75) Inventor: Dietmar Schwabe, Neumark (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 13/178,332

(22) Filed: Jul. 7, 2011

(65) Prior Publication Data

US 2012/0038407 A1    Feb. 16, 2012

(30) Foreign Application Priority Data

Jul. 7, 2010    (EP) ..................................... 10168674

(51) Int. Cl.
*H03L 5/00*    (2006.01)

(52) U.S. Cl.
USPC .......................................... 327/321; 327/309

(58) Field of Classification Search
USPC .................. 327/306, 309, 316, 321–325, 312
See application file for complete search history.

(56) References Cited

U.S. PATENT DOCUMENTS

| | | | |
|---|---|---|---|
| 4,716,358 A | 12/1987 | Fucito | |
| 5,654,654 A | 8/1997 | Franklin | |
| 7,132,821 B2 * | 11/2006 | Camara et al. | 323/315 |
| 7,504,874 B2 * | 3/2009 | Oehm | 327/513 |
| 7,538,529 B2 * | 5/2009 | Nishida | 323/282 |

* cited by examiner

*Primary Examiner* — Dinh T. Le
(74) *Attorney, Agent, or Firm* — Cozen O'Connor

(57) ABSTRACT

A circuit arrangement in which a further electronic component for connecting and amplifying an electrical voltage is arranged between a first series arm and a second series arm to achieve limiting of a voltage between a first clamping point and a second clamping point in the circuit arrangement. An input of the second component is connected by a resistor to the output of a third component, and a device for producing a second reference voltage is arranged between the second series arm and the second component such that it is possible lower the voltage at the first clamping point when the flow of current through the load resistor is interrupted.

5 Claims, 1 Drawing Sheet

CIRCUIT ARRANGEMENT AND INPUT ASSEMBLY

BACKGROUND OF THE INVENTION

1. Field of the Invention

The invention relates to a circuit arrangement for limiting a voltage between a first clamping point and a second clamping point comprising a first series arm and a second series arm, wherein the two series arms have an operating voltage applied between them, an electronic component for connecting and amplifying an electrical voltage, the component being arranged between the series arms, having an input to which a first reference voltage is connected and an output connected by a second resistor to an input of another electronic component for connecting and amplifying an electrical voltage, wherein the another electronic component is arranged between the series arms such that a current can flow from the first series arm via the clamping points, the another electronic component and by a first resistor to the second series arm when the clamping points have a load resistor arranged between them.

2. Description of the Related Art

In general, circuit arrangements, such as a current source or voltage source for producing an output voltage between clamping points, are known.

A drawback of the conventional circuit arrangement, however, is that when no load is arranged between the clamping points or, for example, a wire fracture occurs in the line that interconnects the load between the clamping points, or the load resistor assumes a high-resistance state, an idle voltage can assume inadmissibly high values.

SUMMARY OF THE INVENTION

It is therefore an object of the invention to provide a circuit arrangement in which the idle voltage is limited.

This and other objects and advantages are achieved in accordance with the invention by providing a circuit arrangement that is configured to limit a voltage between a first clamping point and a second clamping point. In accordance with the invention, the circuit arrangement comprises a first electronic component, a second electronic component and a third electronic component, a first series arm and a second series arm, where an operating voltage is applied between the first and second series arms.

The third electronic component is arranged between the first and second series arms, where the third electronic component has an input to which a first reference voltage is connected and an output and is configured to connect and amplify the first reference voltage.

The first electronic component is arranged between the first and second series arms to permit a current to flow from the first series arm through the first and second clamping points, the first electronic component and through a first resistor to the second series arm when a load resistor is arranged between the first and second clamping points, where the first electronic component has an input connected by a second resistor to the output of the third electronic component.

In addition, the second electronic component is configured to connect and amplify the electrical voltage and is arranged between the first and second series arms, where an input of the second electronic component is connected by a third resistor to the output of the third electronic component.

The circuit arrangement also includes a device that is configured to produce a second reference voltage, where the device is arranged between the second series arm and the second electronic component, and the second reference voltage of the device is configured to lower the voltage at the first clamping point occurs when a flow of current through the load resistor is interrupted.

Such a circuit arrangement is advantageously used in input assemblies that are designed to connect resistance temperature measurement sensors.

In an embodiment of the invention, the circuit arrangement is provided with a second electronic component for connecting and amplifying electrical voltage and a first reference voltage is used such that in the case that a wire fracture occurs at the first and second clamping points, for example, it is possible to lower the voltage at the first clamping point.

Such overvoltage limiting can be dimensioned arbitrarily for existing current and/or voltage conditions, and can be readily customized in the existing circuit arrangements given specific circumstances. Particularly, in the case of input assemblies, such as analog input assemblies, as are used in process automation, the disclosed circuit arrangement is advantageous, because disturbing influences in resistive temperature detectors (RTD inputs), for example, as caused by the increased idle voltage, are avoided for adjacent input channels of the input assemblies.

Electronic components that can be used are transistors, field effect transistors (FETs), metal-oxide-semiconductor field-effect transistors (MOS-FETs) or operational amplifiers individually or else in combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and an exemplary embodiment are explained in more detail in the drawing, in which.

DETAILED DESCRIPTION OF THE PRESENTLY PREFERRED EMBODIMENTS

Figure 1:
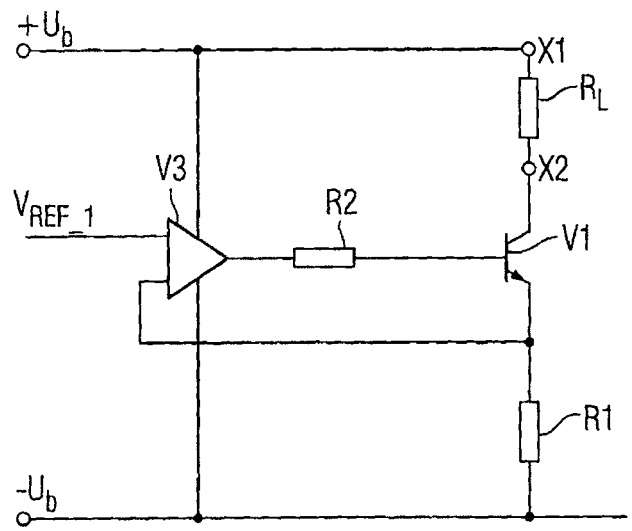
FIG. 1 is schematic block diagram of a circuit arrangement in accordance with the prior art.

FIG. 1 shows a prior art circuit arrangement. For a measuring transducer, a load resistor $R_L$ is connected to a first clamping point X1 and a second clamping point X2, for example. The load resistor $R_L$ preferably comprises a PT resistor, i.e., a temperature-dependent resistor. If a wire fracture occurs for this load resistor $R_L$, inadmissibly high voltage values can arise at the clamping points X1 and X2. In order to prevent this disturbance, the circuit arrangement of FIG. 1 is thus provided with further components, as shown in FIG. 2, in order to achieve voltage limiting of the voltage between the first clamping point X1 and the second clamping point X2.

Figure 2:
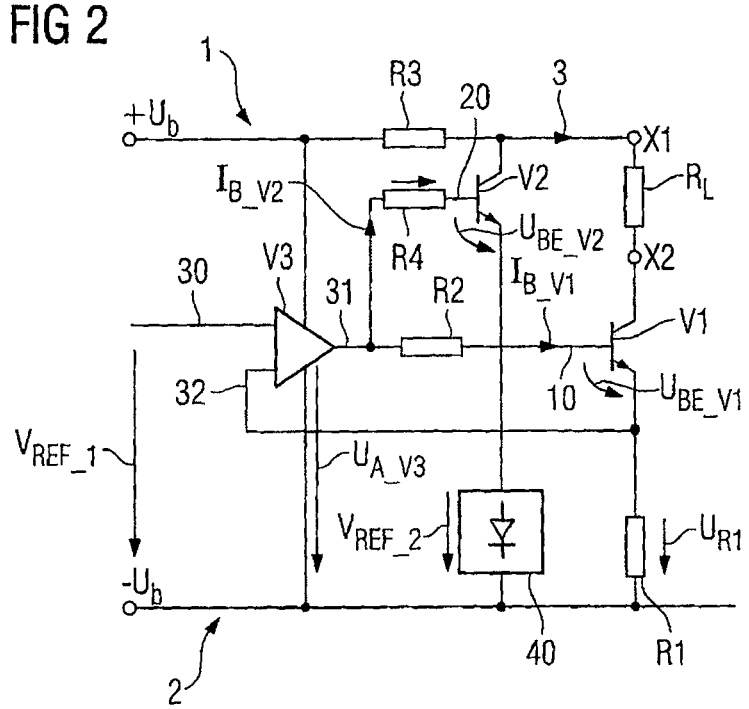
FIG. 2 is a schematic block diagram of an extended circuit arrangement for limiting a voltage between a first clamping point and a second clamping point in accordance with an embodiment of the invention.

FIG. 2 shows a circuit arrangement that solves overvoltage problems at the first and second clamping points X1 and X2 by including further circuit-related measures and components. Here, a first series arm 1 and a second series arm 2, where the two series arms 1, 2 have an operating voltage $U_b$ applied between them, and have a third electronic component V3 for connecting and amplifying an electrical voltage arranged between them. The third electronic component V3 comprises an operational amplifier and has an input 30. This input 30 has a first reference voltage $V_{REF\_1}$ applied to it. The series arms 1,2 also have a first electronic component V1 arranged between them, where a current from the first series arm 1 can flow through the first electronic component V1 through the clamping points X1, X2 and can drain away to the second series arm 2 through a first resistor R1 when the clamping points X1, X2 have a load resistor $R_L$ arranged between them. An output 31 of the third electronic component V3 is connected to an input 10 of the first electronic component V1 by a second resistor R2. In order to actuate the first component V1, the third electronic component V3 can use the output 31 to drive a current into the first component V1. This current appears as a base current $I_{B\_V1}$ for the first transistor when the first electronic component V1 comprises a transistor.

In order to limit an unnecessarily high idle voltage between the clamping points X1 and X2, the first series arm 1 and the second series arm 2 also have a second electronic component V2 for connecting and amplifying an electrical voltage arranged between them, where an input 20 of the second electronic component V2 is connected to the output 31 of the third electronic component V3 by a fourth resistor R4. In addition, arranged between the second series arm 2 and the second electronic component V2 is a device 40 for producing a second reference voltage $V_{REF\_2}$. This circuit-related measure can achieve lowering of the voltage at the first clamping point X1 when the flow of current through the load resistor $R_L$ is interrupted or the load resistor $R_L$ assumes inadmissibly high-resistance values.

The third electronic component V3 comprises an operational amplifier, and in this circuit a portion of the output voltage from the operational amplifier is fed back to an inverting input. The feedback is achieved by a feedback line 32, where the feedback voltage is produced by a voltage divider that is obtained from the series circuit comprising the load resistor $R_L$, the first electronic component V1 and the first resistor R1, which are arranged in a series circuit between the first series arm 1 and the second series arm 2. The relationship for calculating the voltage divider can be used to determine the gain of this circuit.

In the embodiment shown in FIG. 2, the first electronic component V1 is a first transistor. So long as it is possible to form a current path 3 through the first clamping point X1 and the second clamping point X2 to the second series arm, it is accordingly possible for a current to flow through the collector of the first transistor. Here, the current determined by the first reference voltage $V_{REF\_1}$ and the first resistor R1 flows through the load resistor $R_L$. An output voltage $U_{A\_V3}$ from the third electronic component V3 then assumes approximately the value $V_{REF\_1}+U_{BE\_V1}+I_{B\_V1}*R2$, which corresponds approximately to the first reference voltage $V_{REF\_1}+$ 0.8 volt. If the load resistor $R_L$ becomes very large or if the flow of current through the load resistor $R_L$ is even interrupted entirely, the voltage $U_{R1}$ at first resistor R1 falls below the value of the first reference voltage $V_{REF\_1}$. Accordingly, the third electronic component V3, i.e., the operational amplifier, then attempts to restore equilibrium at its inputs 30, 32, where equilibrium comprises obtaining an input voltage difference that is as close as possible to zero. To this end, the third component V3 will increase its output voltage $U_{A\_V3}$. If this output voltage $U_{A\_V3}$ then exceeds a threshold voltage of $V_{REF\_2}+U_{BE\_V2}+I_{B\_V2}*R4$, the second component V2 starts to turn on which prompts a fall in the voltage at the clamping point X1. When the second component V2 is turned on completely, in which case the first component V1 is likewise completely on, the output voltage difference between the first clamping point X1 and the second clamping point X2 is equal to the difference between the second reference voltage $V_{REF\_2}$ and the first reference voltage $V_{REF\_1}$. The choice of the two reference voltages $V_{REF\_1}$ and $V_{REF\_2}$ can thus be used to readily determine the output voltage at the clamping points X1, X2 of the circuit arrangement.

In an embodiment, the second reference voltage $V_{REF\_2}$ may be formed across one or more diodes. Influence on a switching point for the second component V2 is determined by the level of the second reference voltage $V_{REF\_2}$, its base/emitter voltage $U_{B\_V2}$ and the voltage drop across the fourth resistor R4. A further option for altering the switching point is to insert one or more diodes, which in the case of higher voltages comprise Zener diodes, between the fourth resistor R4 and the input 20 of the second component V2. When the second component V2 comprises a transistor, the input 20 corresponds to the base connection of this transistor.

The circuit arrangement in accordance with the invention can be used to easily dimension overvoltage limitations in a wide range, and to readily match the dimensioned overvoltage limitations to the respective specific circumstances. The prevention of overdrive is thus highly advantageous in the case of analog input assemblies using the circuit arrangement in accordance with the invention, particularly in the case of resistance temperature detector (RTD) inputs. In conventional circuits, these overdrive effects are perceivable as a disturbance, because they affect adjacent channels in input assemblies.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A circuit arrangement configured to limit a voltage between a first clamping point and a second clamping point, the circuit arrangement comprising:

a first electronic component, a second electronic component and a third electronic component;

a first series arm and a second series arm, an operating voltage being applied between the first and second series arms;

the third electronic component coupled between the first and second series arms, the third electronic component having an input to which a first reference voltage is connected and an output and being configured to connect and amplify the first reference voltage;

the first electronic component coupled between the first and second series arms to permit a current to flow through a current path from the first series arm through the first and second clamping points, the first electronic component a first resistor and a load resistor is arranged between the first and second clamping points, the first electronic component having an input connected by a second resistor to the output of the third electronic component;

the second electronic component being configured to connect and amplify an electrical voltage and coupled between the first and second series arms, an input of the second electronic component being connected by a third resistor to the output of the third electronic component; and a device configured to produce a second reference voltage and arranged between the second series arm and the second electronic component, the second reference voltage of the device being configured to lower the voltage at the first clamping point occurs when a flow of current through the load resistor is interrupted.

2. The circuit arrangement as claimed in claim 1, wherein the device configured to produce the second reference voltage comprises a diode arrangement.

3. The circuit arrangement as claimed in claim 1, wherein the input of the second electronic component and the output of the third electronic component include a diode arrangement arranged between them for the purpose of altering a switching point for the second electronic component.

4. The circuit arrangement as claimed in claim 2, wherein the input of the second electronic component and the output of the third electronic component include a further diode arrangement arranged between them for the purpose of altering a switching point for the second electronic component.

5. An input assembly configured to connect resistance temperature measurement sensors having a circuit arrangement as claimed in claim 1, wherein the circuit arrangement is configured to perform voltage limiting at the first and second clamping points for the resistance temperature measurement sensors.

* * * * *